United States Patent [19]

Shino

[11] Patent Number: 5,295,199
[45] Date of Patent: Mar. 15, 1994

[54] IMAGE TRANSFORMING APPARATUS AND METHOD

[75] Inventor: Masaaki Shino, Kanagawa, Japan
[73] Assignee: Sony Corporation, Tokyo, Japan
[21] Appl. No.: 975,394
[22] Filed: Nov. 12, 1992

[30] Foreign Application Priority Data

Nov. 15, 1991 [JP] Japan ................................. 3-326736

[51] Int. Cl.⁵ .............................................. G06K 9/00
[52] U.S. Cl. ..................................... 382/41; 395/125; 348/580
[58] Field of Search ....................... 381/1, 41; 358/22; 395/125

[56] References Cited

U.S. PATENT DOCUMENTS

| | | | |
|---|---|---|---|
| 4,899,295 | 2/1990 | Nonweiler | 395/125 |
| 5,077,608 | 12/1991 | Dubner | 395/125 |
| 5,175,806 | 12/1992 | Muskovitz et al. | 395/125 |

Primary Examiner—Leo H. Boudreau
Attorney, Agent, or Firm—Lewis H. Eslinger; Jay H. Maioli

[57] ABSTRACT

An image transforming apparatus for transforming an input video signal representing a two dimensional image into a transformed video signal representing a three-dimensional surface and for depicting illumination of the image is provided. The image transforming apparatus includes a device for defining the three-dimensional surface, a device for providing a mapping data signal for transforming the input signal into the three-dimensional surface, a device for transforming the input video signal in accordance with the mapping data signal so as to generate the transformed video signal, a device for storing a plurality of illumination pattern data signals each of which depicts differential illumination of the transformed video signals, a device for mixing the illumination pattern signals in accordance with the mapping data signal so that the mixing ratio of the illumination pattern signals is varied and a device for depicting illumination to the transformed video signal in accordance with the mixed illumination pattern signal. An effect surface, which is an externally defined three-dimensional surface on which the image information processed in accordance with special effect processing is mapped, is changed in shape and the image information is mapped to suit to the so-changed effect surface by controlling the mixing ratio to present a realistic image.

6 Claims, 5 Drawing Sheets

IMAGE TRANSFORMING APPARATUS AND METHOD

BACKGROUND OF THE INVENTION

1. Field of the Invention

This invention relates to an image transforming apparatus (image effect apparatus) for displaying a realistic object etc. by mapping the image information, processed by special effect processing, on an effect surface which is a surface of the image information mapped on an externally defined three-dimensional surface and which is changed in accordance with the information instructing changes in its shape, and by depicting illumination in the manner of taking account of the relation between a light source and a line of sight. It also relates to an image transforming method (image effect processing method) comprising mapping the image information, processed by special effect processing, on an effect surface which is an externally defined three-dimensional surface and which is changed in accordance with the information instructing changes in its shape and by depicting illumination in the manner of taking account of the relation between a light source and a line of sight.

2. Description of the Related Art

There are a variety of methods in the prior art for producing visual effects by taking account of illumination effects. An example of a technique of realistically displaying an object in, for example, computer graphics is shading an object surface. This technique resides in displaying a surface perpendicular to the light beam with utmost brightness and displaying a surface with less brightness as the surface is removed from the perpendicular direction. There is also known a so-called texture mapping, that is, displaying detailed visual information of an object surface or a model of the material quality reproducing the properties of an effect surface.

There has also been used a so-called light tracking method consisting in accurately locating by which route a light beam emanating from a light source is reflected, transmitted or absorbed by an object before ultimately reaching an eye or a pixel and constituting pixels based on the resulting information. The image displayed in accordance with the light tracking method is highly realistic because the method depends on actual calculation of the intensity of reflection of the incident light corresponding to reflectance of a reflecting object as well as the scattering direction of the incident light.

If the light from a light source, such as the sun, is radiated on an effect surface, which is a three-dimensional surface on which the image information processed with special effect processing is mapped, the surface perpendicular to the light is displayed most lightly, while the intensity of reflection is gradually lowered towards an outer periphery, that is, with increasing deviation from the perpendicular direction. If the shape of the effect surface is changed to a cylinder as shown in FIG. 1e, since the portion of the surface perpendicular to the light is parallel to the axis of the cylinder, the light surface perpendicular to the light is displayed as a stripe the size of which is obtained by calculation.

There is also known a method consisting in applying the light only to a predetermined portion of a Z-coordinate in a three-dimensional address space to improve the effect of illumination.

It is noted that, although the image in which the effect of illumination based on the light tracking method is taken into consideration is highly true to the real object, mathematical processing for generating an image is complicated so that extensive calculation is required for image generation. Consequently, in a small-sized system, real-time image data generation is difficult to achieve because of the lower processing speed even if calculation is carried out in accordance with the above-described system to display the image. On the other hand, a realistic image effect cannot be produced by the apparatus which resorts to the above-mentioned simplified method. In view of the above-mentioned problem of the prior art, the present Applicant has already proposed a special effect device in an inexpensive digital effect device in which an image displayed on an effect surface is depicted with realistic effects of illumination by fixing the relation between the incident light and the effect surface.

However, since the relation between the incident light and the effect surface are fixed, there is room for improvement in connection with continuous transition from a plane surface to a curved surface. Consequently, if attempts should be made for mapping the image information on the effect surface which has been moved and rotated arbitrarily, a further improvement is desired to produce a realistic image in which the effects of illumination are exhibited satisfactorily.

OBJECTS AND SUMMARY OF THE INVENTION

It is an object of the present invention to provide an image effect device in which the effects of illumination with higher visual impression may be achieved by a amplified construction and calculation without necessitating extensive processing as is done in the light tracking method.

It is another object of the present invention to provide an image effect processing method in which in mapping the image information on an effect surface, it becomes possible to cope with continuous transition from a plane surface to a curved surface to produce more realistic effects of illumination in connection with special effects such as mapping from a plane surface to a cylinder or a sphere or so called page folding or page turning.

DETAILED DESCRIPTION OF THE PREFERRED EMBODIMENTS

Referring to the accompanying drawings, an image transforming apparatus embodying the present invention is explained in detail.

Figure 2:
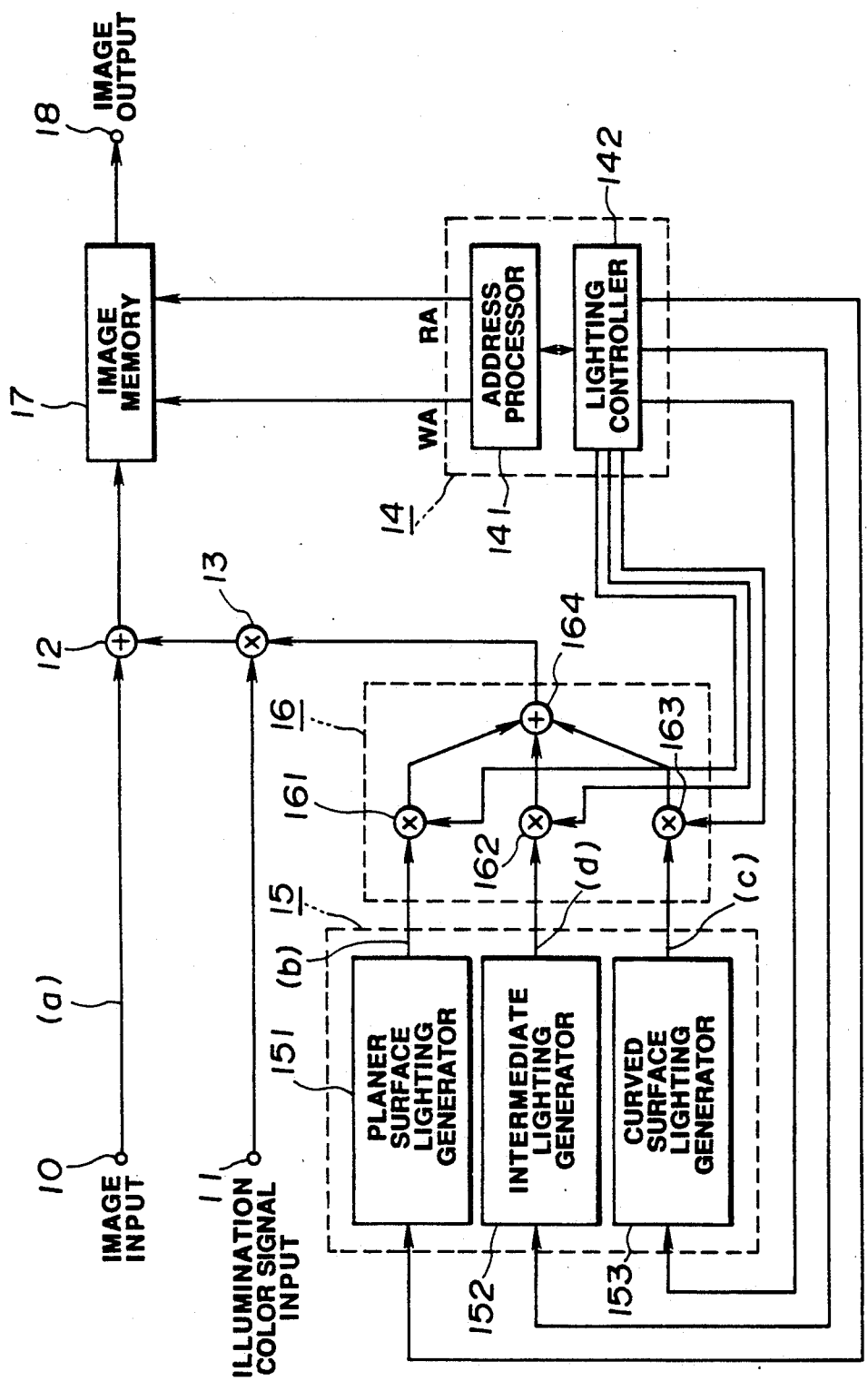
FIG. 2 is a block circuit diagram showing an embodiment of an image transforming apparatus according to the present invention.

Reference is had to FIG. 2 showing, in a block diagram, an image transforming apparatus according to the present invention.

The image transforming apparatus for outputting image signals produced by mapping image information on an effect surface having its shape changed comprises an illumination pattern generator 15, as pattern supplying means, for outputting plural illumination patterns depending on the shapes of predetermined plural effect surfaces, a mixer 16, as pattern mixing means, for mixing the illumination patterns from the illumination pattern generator 15 at a mixing ratio which is changed in accordance with a control signal, an image memory 17 as storage means for storing input image signals, and a controller 14, as illumination effect controlling means, for controlling the mixing ratio of the mixer 16 and addresses of the image memory 17.

The illumination pattern generator 15 is adapted for producing illumination patterns associated with predetermined plural effect surfaces and, in the embodiment illustrated, comprises a plane surface, lighting generator 151 for generating illumination patterns for a plane effect surface, a curved surface lighting generator 153 for generating illumination patterns for a curved effect surface and an intermediate lighting generator 152 for generating intermediate illumination patterns for an effect surface having an intermediate surface between a plane surface and a curved surface.

The mixer 16 is made up of three multipliers 161, 162, 163, associated with the illumination patterns, and an adder 164 for summing outputs from the multipliers 161 to 163. The multipliers 161 to 163 are supplied with multiplication coefficients from a lighting controller 142 provided within the controller 14 to be later described. The multipliers 161 to 183 execute the operations of multiplication to cope with delicate changes in the shape of the effect surfaces, responsive to the multiplication coefficients, and transmit the results of multiplication to the adder 164.

The controller 14 is also supplied from outside with the image controlling information for producing visual effects, such as properties of an object, inclusive of the information producing changes in the shape of the effect surfaces, in a manner not shown. The image transforming apparatus has its respective parts controlled in accordance with the information concerning the shape of at least the effect surfaces contained in the image controlling information. For controlling the respective parts of the image transforming apparatus, the controller 14 comprises a lighting controller 142 for controlling the illumination patterns responsive to the shape of the effect surfaces, and an address processor section 141 for controlling the addresses of the image memory 17 to be later described. The address processor section 141 effects address calculation for generating the shapes of the effect surfaces. The lighting controller 142 and the address processor section 141 exchange the image control information for reciprocally completing the processing operations.

Reference is had to FIG. 2 showing the construction of block circuits for effecting coordinate transformation and continuous mapping on new effect surfaces depending on the shape of the effect surfaces, and to FIGS. 1, 3 and 5 showing outputs of these block circuits.

Figure 3A:
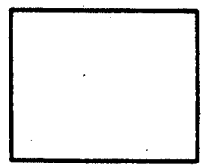
FIGS. 3(a) through 3(d) illustrate continuous transition of the effect surface employed in the image transforming apparatus from a plane surface to a cylindrical surface.

Image signals are input at an input terminal 10 so as to be supplied to an input of an adder 12. The image signals from the input terminal 10 shown in FIG. 2, when represent as an image, represents a rectangular figure as shown in FIG. 3(a). Illumination color signals for producing illumination effects are supplied at input terminal 11.

These illumination image signals are different in level with R, G and B and represent colors by the level ratio.

The illumination color signals are supplied to an input of a multiplier 13, another input of which is supplied with illumination signals indicating the intensity of reflection of illumination responsive to illumination patterns as later explained. The illumination color signals are modulated in the multiplier 13 by the illumination signals so as to be converted into illumination image signals. The illumination image signals are supplied to the other input of the adder 12 so as to be summed with the image signals supplied from input terminal 11. The image signals, including the effect of simulating the reflection of the illumination from adder 12, are supplied to image memory 17.

Signal flow in generating the illumination signals is hereinafter explained.

Figure 3B:
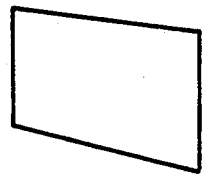
Figure 3C:
Figure 3D:

The illumination signals may be set in a variable manner depending on the light incident direction from a light source and/or the manner of setting the line of sight and/or the image movement/rotation. Various effect surfaces may be thought of, as indicated in FIGS. 3a to 3d. FIG. 3a shows a simple rectangular effect surface and FIG. 3b shows an angled rectangular effect surface in which a rectangle shown in FIG. 3a is angled. The effect surface shown in FIG. 3c is a curved effect surface as contrasted with the effect surfaces shown in FIGS. 3a and 3b. FIG. 3d shows a cylindrical effect surface.

The address processor section 141 of the controller 14 calculates a write address WA and a read address PB to supply the addresses WA and RS to image memory 17 to effect writing and readout to change the shape of the effect surface by coordinate transformation based on the image control information. These address data are also supplied to the lighting controller 142 for simplifying and reciprocally completing the processing operation. The lighting generators provided in the illumination pattern generator 15 generate three types of patterns by taking account of the illumination from the angle information concerning the angle between the incident direction and/or the direction of line of sight associated with the shapes of the effect surfaces with respect to the plane image surface, while generating control signals associated with these patterns. The invention will now be explained by way of example in which control signal generating a weighted signal simulating the intensity of the reflected light associated with a plane surface shown in FIG. 3a is supplied from the lighting controller 142 to the illumination pattern generator 15.

Figure 4A:
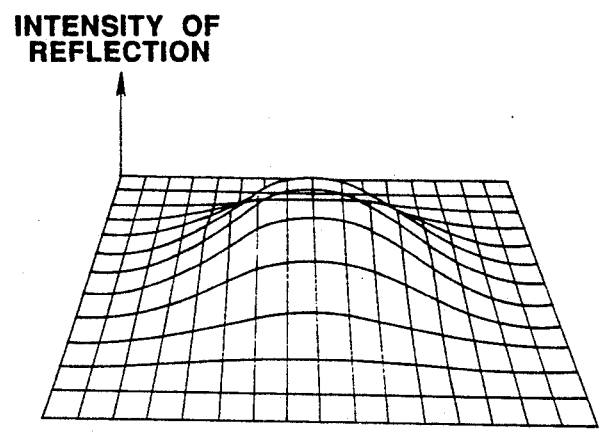
FIGS. 4(a) through 4(c) illustrate patterns of the intensity of reflection of an illumination pattern generator shown in FIG. 1.

Responsive to the supplied control signals, the plane surface lighting generator 151 calculates the lightest reflected portion of the plane surface, based on the angle information between the plane surface and the light incident direction from a light source, such as the sun, and/or the direction of line of sight. The weighted signal has its reflection level lowered gradually concentrically with the lightest reflected portion which is at a position calculated as shown in FIG. 4a. The lightest portion is substantially at right angles to the light source.

Figure 4B:
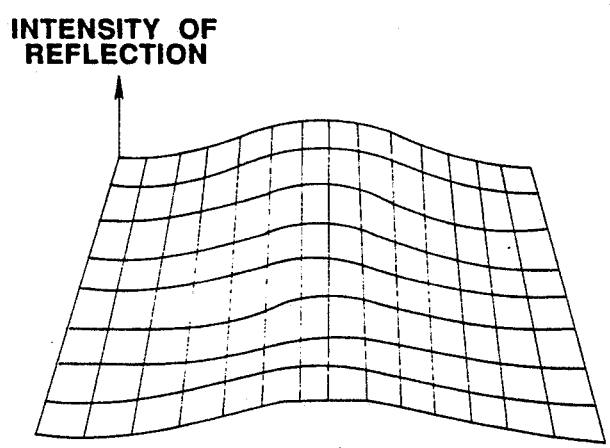

Responsive to control signals, the curved surface lighting generator 163 shown in FIG. 2 calculates the reflecting portion for simulating the reflection of the cylindrical surface by taking account of the angular information of the plane surface with respect to the light incident direction from the light source and/or direction of the line of sight. The weighted signal shown in FIG. 1c causes the intensity of reflection to be rolled substantially uniformly in parallel to the direction of the axis of the cylinder as shown in FIG. 4b to conform to the shape of the effect surface.

Figure 4C:
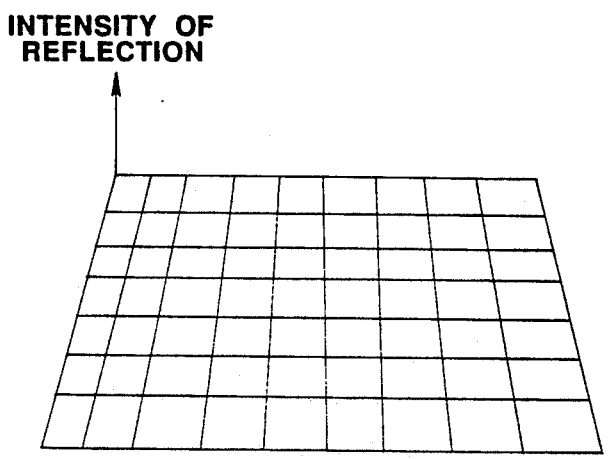

When supplied with a control signal, the intermediate lighting generator 162 shown in FIG. 2 outputs a weighted signal shown in FIG. 2. This output signal represents the intensity of reflection which is uniform on the entire surface as shown in FIG. 4c. This output signal is used for representing a state of the intensity of reflection which is intermediate between the states shown in FIGS. 4a and 4b.

When a planar surface shown in FIG. 3a is selected as the effect surface, controller 14 supplies a multiplication coefficient to a multiplier 161 within the mixer 16 so that an output image outputs 100% of the weighted signal b from the plane surface lighting generator 151, while rendering the multiplication coefficients supplied to the other multipliers 162, 163 to be zero. When a true cylinder shown in FIG. 3d is selected as an effect surface, controller 14 supplies a multiplication coefficient to a multiplier 163 within the mixer 10 so that an output image outputs 100% of the weighted signal c from the curved surface lighting generator 153, while rendering the multiplication coefficients supplied to the other multipliers 161, 162 to be zero. Consequently, the lightest portion lying at right angles to the light source is represented as a band on the effect surface, as shown in FIG. 4(b).

In the present image transforming apparatus, a mode for the shape of the effect surface with nonuniform change ratio is termed a non-linear mode. In order to cope with various shapes of the effect surfaces in the non-linear mode when the effect surfaces proceed continuously from the plane surface to the curved surface, such as a cylinder, control signals supplied from controller 14 in association with the shape of the effect surfaces are supplied to the multipliers 161 to 163 of the mixer 16 for the three illumination patterns. Above all, the multiplication coefficients supplied to the three multipliers 161 to 163 are controlled in connection with the signal mixing ratio in association with the shapes of the effect surfaces. Output signals from these multipliers 161 to 163 are mixed by adder 164 for generating illumination signals.

The adder 164 outputs illumination signals to multiplier 13, as described above. The illumination color signals are multiplied in multiplier 13 by the illumination signals so as to be converted into illumination image signals. The illumination image signals are supplied to an input of the adder 12 so as to be summed with the signal supplied to the other input of the adder. Image signals including the effect simulating the reflection of illumination from adder 12 are supplied to image memory 17. The image signals having the effect of the illumination image signals are fetched as image data into image memory 17 responsive to write address control signal WA from address processor 141 of the controller 14. A control operation taking account of the effect surface is carried out by image memory 17 by readout address control signal RA from address processor 141 of the controller 14. By this address control data in image memory 17 are arrayed at the locations corresponding to the shape of the effect surface. By such address control operation, image signals outputted at output terminal 18 exhibit illumination effects corresponding to the effect surface, and are outputted as an image exhibiting affinity and continuity to the viewer.

Figure 1A:
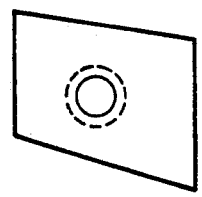
FIGS. 1(a) through 1(e) illustrate continuous transition of the illumination effects conforming to changes in the shape of the effect surface.
Figure 1B:
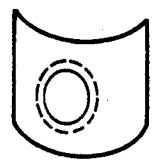
Figure 1C:
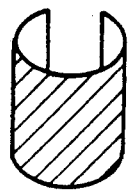
Figure 1D:
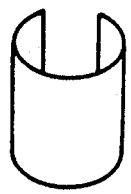
Figure 1E:
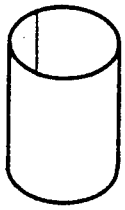

By means of the above-described control operation, the image from output terminal 18 is displayed in such a manner that, as an output image lying in the plane in which the line of sight is at an oblique ahead position as shown in FIG. 1a is changed gradually to a curved surface, the component from the plane lighting generator 151 is decreased gradually from 100% while the component from intermediate lighting generator 152 is correspondingly increased in connection with the mixing ratio. In an intermediate stage between the plane surface and the cylindrical surface, the image consisting of a mixture of the component from the plane surface lighting generator 151 and the component from the intermediate lighting generator 152 is shown in FIG. 1b in which the sun is projected actually on the curved surface. The component from the planar surface lighting generator is gradually decreased from this state to produce an effect in which the curved surface is uniformly illuminated, as shown in FIG. 1c.

As the curvature of the shape of the effect surface is increased further to the shape of a cylinder, the component from the intermediate lighting generator 152 is decreased gradually, while the component from the curved surface generator is increased correspondingly in connection with the mixing ratio. In this case, the region of the effect surface which is illuminated as the effect surface approaches a cylinder is depicted simply as a band in distinction from the uniformly illuminated state. The component from the curved surface lighting generator 153 ultimately reaches 100% for displaying on a cylinder a band region parallel to the axis of the cylinder as the effect surface is illuminated.

In this manner, lighting from a plane surface to a curved surface is carried out without a feeling of discontinuity by changing the mixing ratio depending on the control signal from controller 14. In the present embodiment, an illumination effect is produced by providing the intermediate lighting generator 152 corresponding to an intermediate effect surface, such as shown in FIG. 3c, between a plane surface and a curved surface as an effect surface, in the illumination pattern generator 15. The illumination effect may be easily changed by omitting the intermediate lighting generator or providing one or more intermediate lighting generator(s).

Besides changing the effect surface from a plane surface to a curved surface, the image transforming apparatus according to the present invention may also be employed for page folding, such as page turning or page rolling, by way of a special effect. In this case, an illumination image effect is supplemented at the writing side of the image memory 17 for operatively associating the amount of folding of the image surface with the mixing ratio of the illumination effects corresponding to the respective effect surfaces. FIGS. 5(a) through 5(e) show a case of page turning.

Figure 5A:
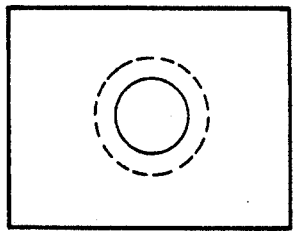
FIGS. 5(a) through 5(e) illustrate so-called page turning in which the llumination effects are taken into account.
Figure 5B:
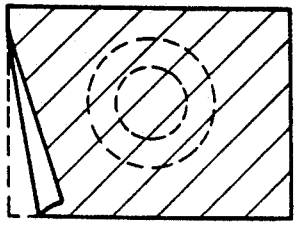
Figure 5C:
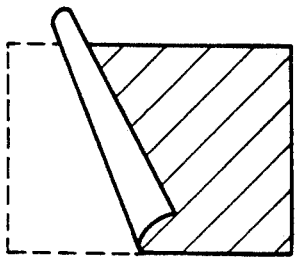
Figure 5D:
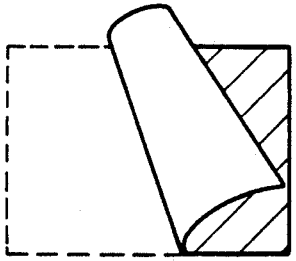
Figure 5E:
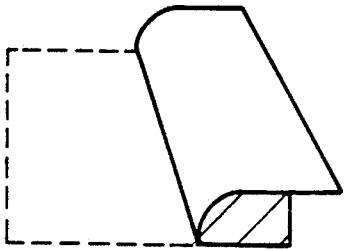

In FIG. 5(a) the sun is displayed on a plane surface with the intensity of reflection similar to that shown in FIG. 4a. In FIG. 5(b) the image surface is rolled from the lower left corner while the sun is not displayed directly but the intensity of reflection is gradually decreased for depicting the portion of the image surface other than the rolled portion with uniform reflection. As the amount of rolling is increased, as shown in FIG. 5(c) a cylindrical effect surface is displayed as if the reverse side of the rolled portion were illuminated. The front side is also depicted with a penumbra (shading). In FIG. 5(e) the effect surface is illuminated so as to take account of the angle between the light beam and the direction of line of sight to produce an effect of illumination as if by actual page turning.

In the embodiment illustrated, since the illumination image signals are added to the image signals prior to coordinate transformation, the lighting controller is controlled by the address controller so that the illumination pattern corresponding to the effect surfaces is produced when the image signals are read out from image memory, that is, at the time of coordinate transformation.

Also, in the embodiment illustrated, the illumination image signals are added to the image signals before the image signals are written in the image memory. However, the illumination image signals may also be added to the image signals read out from the image memory.

In the image effect device, shown in FIG. 2, the illumination image signals may also be added at a read-out side of the image memory 17. The illumination signals added in this case exhibit the intensity of reflection different from that produced when the illumination signals are added at the write side of the image memory 17, as described above.

With the above-described arrangement, visual effects may be rendered to be realistically illuminated by a processing and circuit arrangement simpler than those in which reflection by illumination is computed from pixel to pixel. In functional aspects, it becomes possible for the image transformation apparatus to cope with effect surfaces continuously changed from a planar shape to a curved shape during mapping of the image information on the effect surfaces, so that more realistic illumination effects may be produced in special effects such as page turning or picture folding, or mapping from a planar surface to a cylindrical or spherical surface.

What is claimed is:

1. An image transforming apparatus for transforming an input video signal representing a two-dimensional image into a transformed video signal representing a three-dimensional surface and for depicting illumination thereof, comprising:

means receiving data including said input video signal representing a two-dimensional image and light source position data for defining a shape of said three-dimensional surface based upon said input video signal representing a two-dimensional image and for providing a mapping data signal for transforming said input video signal representing a two-dimensional image into a signal representing said defined three-dimensional surface;

means for transforming said input video signal representing a two-dimensional image in accordance with said mapping data signal so as to generate said signal representing said defined three-dimensional surface;

controller means for producing a plurality of illumination pattern data signals based upon said signal representing said defined three-dimensional surface and said light source position data;

generator means for receiving the plurality of illumination pattern data signals from said controller means for producing for generating a plurality of illumination pattern signals, each of which depicts differential illumination of said defined three-dimensional surface; and means for mixing said plurality of illumination pattern signals in accordance with said mapping data signal so that the mixing ratio of said plurality of illumination pattern signals is varied thereby.

2. The image transforming apparatus according to claim 1, in which said illumination pattern signals include at least a first pattern signal depicting an illumination of a plane surface, and a second pattern signal depicting an illumination of a curved surface.

3. The image transforming apparatus according to claim 1, in which said illumination pattern signals are mixed in said means for mixing with the input video signal.

4. A method for transforming an input video signal representing a two-dimensional image into a transformed video signal representing a three-dimensional surface and for depicting illumination thereof, comprising the steps of:

defining said three-dimensional surface based upon said input video signal representing a two-dimensional image and light source position data;

providing a mapping data signal for transforming said input signal representing a two-dimensional image into a signal representing said defined three-dimensional surface;

transforming said input video signal representing a two-dimensional image in accordance with said mapping data signal so as to generate said signal representing said defined three-dimensional surface;

producing a plurality of illumination pattern data signals based upon said defined three-dimensional surface and said light source position data;

generating a plurality of illumination pattern signals, each of which depicts differential illumination of said defined three-dimensional surface, based upon said plurality of illumination pattern data signals;

mixing said plurality of illumination pattern signals in accordance with said mapping data signal so that the mixing ratio of said illumination pattern signals is varied thereby.

5. The method according to claim 4 in which said plurality of illumination pattern signals includes at least a first illumination pattern signal depicting an illumination of a plane surface, and a second illumination pattern signal depicting an illumination of a curved surface.

6. The method according to claim 4 in which said illumination pattern signals are mixed in the step of mixing with the input video signal.

* * * * *